INVENTOR
GORDON Y. R. ALLEN

United States Patent Office 3,496,418
Patented Feb. 17, 1970

3,496,418
NEUTRAL DRAINAGE REACTOR PROTECTOR DEVICE FOR COMMUNICATION LINES
Gordon Y. R. Allen, 4 Ireland Court, Islington, Toronto, Ontario, Canada
Filed Oct. 22, 1965, Ser. No. 500,717
The portion of the term of the patent subsequent to Feb. 17, 1985, has been disclaimed
Int. Cl. H02h 1/04, 3/22, 1/00
U.S. Cl. 317—61.5      6 Claims

ABSTRACT OF THE DISCLOSURE

A neutral drainage reactor protector device for communication lines employing a pair of inductively coupled coils having a center tap to ground and the free ends of which are connected through capacitors to ground and also connected to a second pair of mutually coupled coils, the ends of which are connected to conventional block protectors to different lines of the communication lines.

---

This invention relates to protective systems and most particularly to drainage reactors for minimizing the effect of lightning surges, electric power station potential rise and/or induction from ground return circuits or currents. Up until this time, it has been the practice as a usual thing to allow line circuit breakers to trip in the event transfer voltage are induced into a telephone pair. Conventional circuits today are equipped with power line circuit breakers or carbon block or gas tube type protectors. When a high transverse voltage appears across circuit elements one or more of these protectors will be fired. On the other hand, there is no guarantee that both sides will be fired or fired simultaneously, thus there is still the problem of a transverse voltage if one side fires. When both protectors fire, there is then a short circuit across the cable or telephone pair.

This results in circuit failure for the amount of time it takes to find which protectors have been fired and remedy the situation. Of course, the fact that there is a short in the circuit is not necessarily indicative that a protector has fired since other causes can result in such a short circuit. Thus, the problem becomes complicated when a short appears. When such a short appears, a new circuit must be placed in operation to bear the functions which were carried by the shorted circuit.

Thus, when a simple protector such as a carbon block or gas fired tube is used, a multiplication of circuits is necessary and an investigation must be made to remedy the problem.

Another objection to the carbon block and mutual drainage reactor which is conventionally used is the fact that if these drainage reactors are adapted to take care of sixty cycle current then they are not well equipped to take care of lightning surges which have an equivalent frequency of 1½ to 2 megacycles. A mutual drainage reactor that can handle 1½ to 2 megacycles voltage cannot also handle 20 or 60 cycle voltage since its impedance at one frequency will be quite different from its impedance in another frequency.

These problems are frequently met in transmission work and account for much circuit breakdown.

It is a purpose of this invention to provide suitable impedance and protective circuit that will cover the frequency ranges of sixty cycles and 1½ megacycle to 2 megacycles in a single circuit.

It is another purpose of this invention to provide a simple easily assembled mutual drainage reactor for use with telephone circuits.

It is another object of this invention to provide a mutual drainage reactor which will allow circuits to continue operation under surge conditions. More particularly, it relates to a protective system for protecting electrical circuits from transverse voltages as a result of lightning surges, electric power station ground potential rise, and/or induction from ground return currents.

In general it has been the practice to give over voltage protection to a circuit by means of ground drain-off that is connected to ground or by means of circuitry to induce an equal voltage in the accompanying line thus preserving circuit balance. In these ways avoidance of circuit damage was assured because there would be no circuit potential difference to cause circuit failure or damage.

It is still another object of this invention to provide a circuit network which will work as a mutual drainage reactor at 1.5 to 2 megacycles and will work equally well at sixty cycles and will also provide a relatively high shunt impedance at the normal winging circuit of 20 cycles.

These and other features of the invention may be more readily understood by turning to the accompanying drawing, in which.

Figure 1:
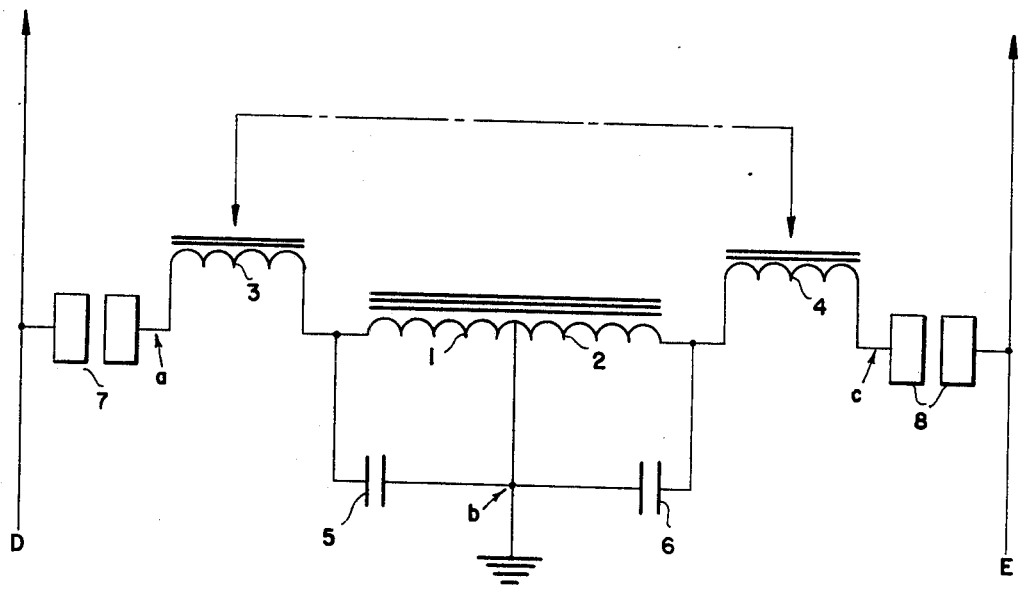
FIGURE 1 shows a mutual drainage reactor according to one embodiment of the invention.

Considering now FIGURE 1 of the drawing, there is shown a mutual drainage reactor protective system which is electrically connected between two wires D and E. The first element connected to each of these wires is a standard carbon block protector 7, 8 which will usually have a voltage breakdown in the region of 350 to 500 volts. Electrically connected to these carbon block protectors are reactance coils 3 and 4 which are carefully balanced and are magnetically coupled to each other as shown by the dot dash line extending between them. The ends of these reactors are electrically connected to a junction. One method of effecting this magnetic connection is to wind coils 3 and 4 upon the same core or to mutually wind them in overlap on the same core structure. In order to impart proper characteristics, the core structure should be made of either ferrite, powdered iron, or other high frequency core material. Coils 3 and 4 are designed to be saturated at 1.5 to 2 megacycles and 500 to 750 volts. Centrally located to these coils is a drainage coil 1 and 2 which is wound onto a laminated steel core structure and has a relatively high impedance across the total winding at sixty cycles per second and 20 cycles per second. This coil is centrally tapped to ground and each end of this coil is connected to corresponding coil 3 or 4. On each side of this high impedance reactor a condenser is electrically attached to ground. Thus, two condensers are part of this circuit one on each side of the high impedance reactor and located between it and the coupled reactor.

High voltage breakdown gas tubes ar a carbon block can be inserted for the capacitor with no loss of function.

The operation of this neutral drainage reactor is as follows:

If a lighting surge hits line D, the protector will be fired and current will flow through all the coils and the capacitor to ground. This will cause a voltage equal and opposite to the inducing voltage to form in the other half of the network. When this voltage is formed in the other half of the network, the other protectors will also be fired. At the same time, a voltage will be induced in the other line E. The twenty or sixty cycle current which normally flows in lines D and E will pass through this circuit. Consider, for example, the 20 cycle normal winging current frequency. This frequency will pass through the protectors 7, 8 on each side, the first coil 3, 4 on each side and then will come against the high impedance coil 1, 2 in the center. This coil presents high impedance to 20 to 60 cycles and since the coils are wound to buck, the current flowing into the center coils 1 and 2 will flow and will buck making a very high impedance so that the total shunt impedance will be quite high since there is no low impedance path across the lines D and E. Thus, no current will flow across the mutual drainage reactor at this frequency.

If the alternate high voltage breakdown components are used for the capacitor then the high frequency, high voltage will pass but the low frequency, low voltage component will go into coils 1 and 2.

In another situation, suppose that a sixty cycle voltage is present and fires the left hand protector 7. Then, if this sixty cycle voltage is sufficiently high, the protector 7 will fire and the current will flow through coil 3. Since coil 3 becomes saturated, no voltage will be generated across its opposite coil wire. However, since slight voltage and current will be flowing through inner coil 1, an equal and opposite voltage will be induced in inner coil 2 and this will cause the firing of the opposite protector block 8.

One can readily see that under any combination of lightning surge voltages and/or sixty cycle surge voltages, this network will provide a nearly simultaneous firing of carbon blocks and thus provide a pass to ground for the unwanted current. If the disturbing voltage is caused by lightning surge or sixty cycle surge, the transverse impedance across the lines will remain the same. The net effect of surges of lightning and 60 cycle inductance would then be to allow the circuit to continue to function in a normal manner.

Figure 2:
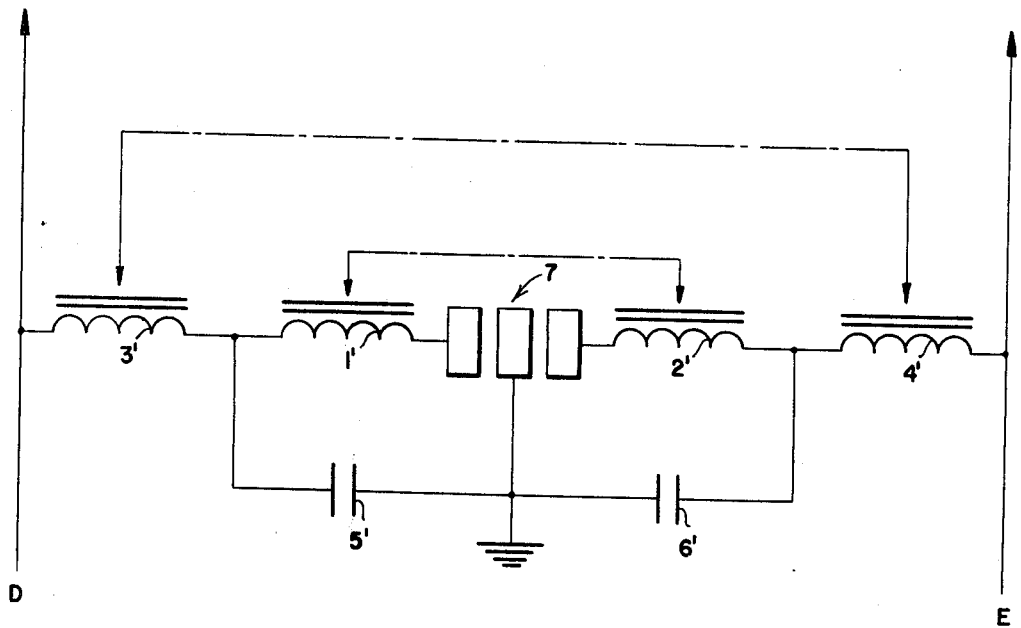
FIGURE 2 shows another similar embodiment of the invention according to my invention.

Turning our attention now to FIGURE 2, one can readily appreciate that this alternate circuit will perform in a very similar way to the method outline above in regard to FIGURE 1. In the circuit shown in FIGURE 2, the carbon block protector units of FIGURE 1 have been moved to the center and a three element carbon block protector has been inserted in their place. In this unit, coils 1' and 2' are magnetically coupled as shown and coils 3' and 4' are magnetically coupled. The coupling may be brought about by winding the coils on a common core or some other means. The circuit operates in a fashion almost exactly like that shown or described in regard to FIGURE 1.

An alternative to the use of capacitors 5' and 6' above is the use of high voltage breakdown gas tubes and carbon blocks which will operate only at the relatively high voltage of lightning surges. These could be substituted as an alternative for the capacitors.

This invention may be used in a variety of circumstances since the only qualification is that a pair of wires be concerned and that one of the wires is subjected to a voltage of some frequency which causes a transverse voltage to exist between the pair of wires. The values given above are designed for the elements in the circuit networks and are illustrative of a particular case. Where different operating conditions are found, or where conductors of different designs are used, the values of these elements will vary to fit the particular case. Further, the invention may be used with any type of conductor and in any situation with a variety of frequencies and potentials.

What is claimed is:

1. In a protective system for communication lines, a pair of inductively coupled coils, a center tap from said coils to ground, the free ends of said coils being connected through high voltage breakdown components to ground, said free ends of said coils being further connected each to a coil of a second pair of mutually coupled coils, and gap protector means connected between the ends of said seconds coils and the different lines of said communication lines.

2. A protective circuit as in claim 1 in which said high voltage breakdown components are capacitors.

3. In a protective system for communication lines, a pair of inductively coupled coils having a high impedance at a low frequency and having their windings connected in series, a center tap to ground from the inductive center of said coils, the free ends of each said coil being respectively connected to a pair of high voltage breakdown components, said components being connected to ground and being resonant at a high frequency, said free ends of said coils being further connected each to a coil of a second pair of mutually coupled coils, each coil of said second pair saturates respectively at a high frequency and high voltage and at a low frequency and low voltage, each free end of said second coils being connected through a carbon protector to a separate conductor of said lines.

4. A protective circuit as in claim 3 wherein said high voltage breakdown components are capacitors.

5. A protective system for communication lines comprising a three element carbon block protector having its central element connected to ground, the outer elements of the carbon block being connected to one end of each of a pair of inductively coupled coils, the outer ends of the coils being connected through high voltage breakdown components to ground, said outer ends being further connected each to a coil of a second pair of mutually coupled coils, the other ends of each of said second pair of coils being connected to different lines of said communication lines.

6. A protective system for communication lines as in claim 5 wherein said high voltage breakdown components are capacitors.

References Cited

UNITED STATES PATENTS

| | | | |
|---|---|---|---|
| 454,673 | 6/1891 | Thomson | 317—61.5 X |
| 508,649 | 11/1893 | Thomson | 317—61.5 X |
| 682,714 | 9/1901 | Kelly | 317—61 |

LARAMIE E. ASKIN, Primary Examiner

U.S. Cl. X.R.

307—93; 315—343; 317—69